(12) United States Patent
Yomo et al.

(10) Patent No.: US 8,545,910 B2
(45) Date of Patent: *Oct. 1, 2013

(54) METHOD OF PROCESSING GREEN COFFEE BEANS BY USING SURFACE-TREATED COFFEE CHERRIES

(75) Inventors: Hideko Yomo, Osaka (JP); Toshiharu Nakajima, Tokyo (JP); Takeshi Yonezawa, Hyogo (JP)

(73) Assignee: Suntory Holdings Limited, Osaka-shi, Osaka (JP)

( * ) Notice: Subject to any disclaimer, the term of this patent is extended or adjusted under 35 U.S.C. 154(b) by 597 days.

This patent is subject to a terminal disclaimer.

(21) Appl. No.: 11/886,842

(22) PCT Filed: Mar. 24, 2006

(86) PCT No.: PCT/JP2006/305966
§ 371 (c)(1),
(2), (4) Date: May 28, 2008

(87) PCT Pub. No.: WO2006/101196
PCT Pub. Date: Sep. 28, 2006

(65) Prior Publication Data
US 2009/0130259 A1 May 21, 2009

(30) Foreign Application Priority Data
Mar. 24, 2005 (JP) .................................. 2005-086883

(51) Int. Cl.
*A23F 5/00* (2006.01)
(52) U.S. Cl.
USPC ............................................. 426/45; 426/595
(58) Field of Classification Search
USPC .................................................. 426/45, 595
See application file for complete search history.

(56) References Cited

U.S. PATENT DOCUMENTS

| | | | |
|---|---|---|---|
| 1,313,209 A | 8/1919 | Robison | |
| 1,376,870 A | 5/1921 | Graff et al. | |
| 2,321,148 A | 6/1943 | Kirby et al. | |
| 2,341,724 A | 2/1944 | Kennedy | |
| 2,526,872 A | 10/1950 | Johnston et al. | |
| 2,607,690 A | 8/1952 | Johnston et al. | |
| 3,153,377 A | 10/1964 | Bosak | |
| 3,373,041 A | 3/1968 | Bloom et al. | |
| 4,161,549 A | 7/1979 | Ohno | |
| 4,278,696 A | 7/1981 | Magnolato | |
| 4,388,341 A | 6/1983 | Seto et al. | |
| 4,867,992 A * | 9/1989 | Boniello et al. | 426/45 |
| 4,976,983 A | 12/1990 | Hirsh et al. | |
| 5,132,134 A | 7/1992 | Nini et al. | |
| 5,267,507 A | 12/1993 | Enomoto | |
| 5,773,065 A | 6/1998 | Clauzure | |
| 5,776,525 A | 7/1998 | Ide et al. | |
| 6,054,162 A | 4/2000 | Bradbury et al. | |
| 6,482,959 B1 | 11/2002 | Baloghne et al. | |
| 6,660,322 B2 | 12/2003 | Zapp et al. | |
| 2004/0005381 A1 | 1/2004 | Okada | |
| 2004/0180112 A1 | 9/2004 | Hagiwara | |
| 2005/0084566 A1 | 4/2005 | Bavan | |
| 2005/0129827 A1 | 6/2005 | Miljkovic et al. | |
| 2007/0190207 A1* | 8/2007 | Takahashi et al. | 426/52 |
| 2009/0104309 A1 | 4/2009 | Nakajima et al. | |
| 2009/0104310 A1 | 4/2009 | Nakajima et al. | |
| 2009/0226568 A1 | 9/2009 | Yomo et al. | |
| 2010/0143539 A1 | 6/2010 | Minami et al. | |

FOREIGN PATENT DOCUMENTS

| | | |
|---|---|---|
| EP | 0282762 A2 | 2/1988 |
| EP | 0837126 A2 | 4/1998 |
| EP | 1 695 631 A1 | 8/2006 |
| EP | 1880614 A1 | 1/2008 |
| JP | 50-088267 | 7/1975 |
| JP | 51-7147 | 1/1976 |
| JP | 51012969 A | 1/1976 |
| JP | 1-112950 | 5/1989 |
| JP | 4023992 A | 1/1992 |
| JP | 4-278072 | 10/1992 |
| JP | 5161488 A | 6/1993 |
| JP | 6-343390 | 12/1994 |
| JP | 9-502099 | 3/1997 |
| JP | 10-113163 | 5/1998 |
| JP | 11009190 A | 1/1999 |

(Continued)

OTHER PUBLICATIONS

Roussos, S. et al. 1995. Biotechnological management of coffee pulp-isolation, screening, characterization, selection of caffeine-degrading fungi and natural microflora present in coffee pulp and husk. Appl. Microbiol. Biotechnol. 42: 756-762.*

International Preliminary Report on Patentability and Written Opinion issued Aug. 21, 2008, for PCT/JP2006/305966 filed Mar. 24, 2006.

International Search Report dated Jun. 20, 2006 for PCT/JP2006/305965 filed Mar. 24, 2006.

Extended European Search Report issued in European Application No. EP 06729914.9 mailed May 8, 2009.

Pastore et al., "Production of Fruity Aroma by Newly Isolated Yeast," Apr. 1994, Biotechnology Letters, vol. 16, No. 4; pp. 389-392.

(Continued)

*Primary Examiner* — D. Lawrence Tarazano
*Assistant Examiner* — Hamid R Badr
(74) *Attorney, Agent, or Firm* — Drinker Biddle & Reath LLP

(57) ABSTRACT

There is provided a method for processing green coffee beans capable of imparting new aromas and flavors to a coffee beverage using a simple operation, without incurring an increase in raw material costs.

The method for processing green coffee beans includes a fermentation step of bringing nutritive substances included in coffee cherries and microorganisms into contact with one another and causing fermentation, and a collection step of separating and collecting green coffee beans from the coffee cherries that have undergone the fermentation step, wherein in the fermentation step, at least part of the pulp of the coffee cherries is exposed, and the microorganisms are caused to come into direct contact therewith.

1 Claim, No Drawings

(56) References Cited

FOREIGN PATENT DOCUMENTS

| JP | 11043390 A | 2/1999 |
|---|---|---|
| JP | 11-319789 | 11/1999 |
| JP | 2001-178431 | 7/2001 |
| JP | 2003146897 A | 5/2003 |
| JP | 2004081053 A | 3/2004 |
| WO | WO 2005/029969 A1 | 9/2004 |
| WO | WO-2006101195 A1 | 9/2006 |
| WO | WO-2006101196 A1 | 9/2006 |
| WO | WO-2006126587 A1 | 11/2006 |
| WO | WO-2006126588 A1 | 11/2006 |
| WO | WO-2008062886 A1 | 5/2008 |

OTHER PUBLICATIONS

Suarez-Quiroz et al. "Study of ochratoxin A-producing strains in coffee processing," 2004, International J. Food Science and Technology, 39, pp. 501-507) (Published online Apr. 27, 2004).

Yoshihito Hikawa et al., "Enological Characteristics of Various Wine Making Yeasts", Report of the Yamanashi Industrial Technology Center, 2004, No. 18, pp. 141-144.

L. Eduardo Betancourt et al., "Bedingungen Des Mikrobiellen Verderbs Von Grunem Kaffee. 1. Mitteilung: Sorptionsverhalten and SchimmelBildung", Deutsche Lebensmittel-Rundschau, 1983, vol. 79, No. 11, pp. 366-369.

S. Avallone et al., "Fate of Mucilage Cell Wall Polysaccharides During Coffee Fermentation", J. Agric. Food Chem., 2001, vol. 49, pp. 5556-5559, Published by American Chemical Society Oct. 10, 2001.

Michitaka Naito et al., "Anti-Atherogenic Effects of Fermented Fresh Coffee Bean, Soybean and Rice Bran Extracts", Food Sci. Technol. Res., 2003, vol. 9, No. 2, pp. 170-175.

Daigle, P. et al., 1999, Production of aroma compounds by *Geotrichum candidum* on waste bread crumb, Food Microbiol., 1999, 16, pp. 517-522.

International Search Report dated Jun. 20, 2006, for PCT/JP2006/305965 filed Mar. 24, 2006.

International Search Report dated Aug. 1, 2006 for PCT/JP2006/310352 filed May 24, 2006.

M. Sivetz et al., "Fruit—Green, Roast, and Soluble Coffee," Coffee Processing Technology, pp. 48-49, The Avi Publishing Company, Inc., Westport, Connecticut.

Supplementary European Search Report and European Search Opinion issued May 27, 2009, in European Application No. EP 06746786.0.

International Preliminary Report on Patentability and Written Opinion issued Dec. 13, 2007, for PCT/JP2006/310352, filed May 24, 2006 (translation).

Joyeux et al., "Evolution of Acetic Acid Bacteria During Fermentation and Storage of Wine," Applied and Environmental Microbiology, vol. 48, No. 1, Jul. 1984, pp. 153-156.

International Preliminary Report on Patentability and Translation of Written Opinion mailed Aug. 12, 2008 in PCT International No. PCT/JP2006/305965, filed Mar. 24, 2006.

International Preliminary Report on Patentability and Translation of Written Opinion mailed Sep. 9, 2008 in PCT International Application No. PCT/JP2006/310353, filed May 24, 2006.

International Search Report mailed Feb. 25, 2008 in PCT International Application No. PCT/JP2007/072701, filed Nov. 16, 2007.

English language translation of Hikwaw et al., "Enological Characteristics of Various Wine Making Yeasts," Report of the Yamanashi Industrial Technology Center, 2004, No. 18, pp. 141-144.

Computer Translation of PCT International Publication No. WO 2005/029969 A1, published Apr. 7, 2005.

Lentner et al., "Organic acids in coffee in relation to the degree of roast," Journal of Food Science vol. 24, Issue 5, pp. 483-492 (1959).

Avallone et al., "Microbiological and Biochemical Study of Coffee Fermentation," Current Microbiology, 2001, pp. 252-256, vol. 42, Springer-Verlag.

Agate et al., "Role of Pectinolytic Yeasts in the Degradation of Mucilage Layer of *Coffea Rubusta* Cherries," Applied Microbiology, Mar. 1966; pp. 256-260, vol. 14, No. 2, American Society for Microbiology.

International Search Report mailed Aug. 1, 2006 in PCT International Application No. PCT/JP2006/310353, filed May 24, 2006.

International Preliminary Report on Patentability dated Jun. 26, 2006, including Translation of Written Opinion, in PCT International Application No. PCT/JP2004/013793, filed Sep. 22, 2004.

International Search Report mailed Dec. 28, 2004 in PCT International Application No. PCT/JP2004/013793, filed Sep. 22, 2004.

International Search Report mailed Jun. 20, 2006 in PCT International Application No. PCT/JP2006/305966, filed Mar. 24, 2006.

International Preliminary Report on Patentability and Written Opinion dated May 26, 2009 in PCT International Application No. PCT/JP2007/072701, filed Nov. 16, 2007.

\* cited by examiner

METHOD OF PROCESSING GREEN COFFEE BEANS BY USING SURFACE-TREATED COFFEE CHERRIES

CROSS REFERENCE TO RELATED APPLICATIONS

This application is the National Stage of International Application No. PCT/JP2006/305966 filed Mar. 24, 2006, and claims benefit of Japanese Application No. 2005-086883 filed Mar. 24, 2005, both of which are herein incorporated by reference in their entirety.

TECHNICAL FIELD

The present invention relates to a method for processing green coffee beans including a fermentation step of bringing nutritive substances included in coffee cherries and microorganisms into contact with one another and causing fermentation, and a collection step of separating and collecting green coffee beans from the coffee cherries that have undergone the fermentation process.

BACKGROUND ART

The following is a simplified description of a process for producing a coffee beverage. First, the husk and pulp portions of coffee cherries (the fruit of *Coffea* plants of the family Rubiaceae) are removed, and green coffee beans are obtained thereby (a refining process). Roasted coffee beans are then produced by carrying out a heat treatment process on the obtained green coffee beans (a roasting process). It should be noted that the components that form the basis of the tastes and aromas unique to coffee (referred to as "coffee flavor and aroma components" hereinafter) are produced in the roasting process. After the roasting process, the roasted coffee beans are ground and soaked with hot water, thereby extracting the coffee flavor and aroma components. This extract is provided as a coffee beverage.

At present, demand for coffee beverages as pleasure beverages continues to rise, and consumer tastes are diversifying with regard to coffee flavor and aroma.

A conventional method of creating coffee bean roasts, in which various types of roasted coffee beans with different degrees of roasting are produced by changing the heating temperature, heating duration, and the like during the roasting process, is generally employed as a method for creating diverse coffee flavors and aromas in order to respond to such consumer needs.

In another such method, ground green coffee beans are inoculated with and fermented by *A. oryzae* and then roasted, and the coffee flavor and aroma components generated at this time are extracted. The extracted coffee flavor and aroma components are then added to coffee products such as coffee extract, roasted coffee beans, ground coffee, and the like, thereby enhancing the coffee flavor and aroma (see patent reference 1).

[Patent Reference 1] JP H1-112950A

DISCLOSURE OF INVENTION

Problem to be Solved by the Invention

According to the method of creating various types of roasted coffee beans with different degrees of roasting, the degree of roasting is, at present, divided into eight levels (from a light roast to an Italian roast). Although roasted coffee beans with differing degrees of tartness, bitterness, and so on can be obtained at each of these levels, the production of new coffee aromas and flavors is limited.

Furthermore, in the method disclosed in the abovementioned patent reference 1, a new processing step, in which the generated coffee flavor and aroma components are extracted and the extract is added to the aforementioned coffee product, is necessary in addition to the conventional coffee beverage production step; therefore, in addition to requiring more time and effort, additional green coffee beans (in a ground state) are required for inoculation with and fermentation by the *A. oryzae*, which gives rise to a problem that raw material costs are increased. Note that this conventional method is a method for enhancing the coffee flavor and aroma, and does not disclose a method for creating new coffee flavors and aromas.

Having been conceived in light of the aforementioned situation, the present invention provides a method for processing green coffee beans capable of adding new, high-quality flavor and aroma to a coffee beverage by a simple operation, without incurring a particular increase in raw material costs and without requiring a new processing step.

Means for Solving Problem (Configuration 1)

A first characteristic configuration of the present invention is a method for processing green coffee beans including a fermentation step of bringing nutritive substances included in coffee cherries and microorganisms into contact with one another and causing fermentation, and a collection step of separating and collecting green coffee beans from the coffee cherries that have undergone the fermentation step, wherein in the fermentation step, at least part of the pulp of the coffee cherries is exposed, and the microorganisms are caused to come into direct contact therewith.

(Configuration 2)

According to a second characteristic configuration of the present invention, in the fermentation step, fermentation is carried out by the microorganisms with at least part of the pulp of the coffee cherries being exposed and the husks of the coffee cherries being left intact.

(Configuration 3)

According to a third characteristic configuration of the present invention, in the fermentation step, fermentation is carried out by the microorganisms with at least part of the pulp of the coffee cherries being exposed and only the husks of the coffee cherries being removed.

(Configuration 4)

According to a fourth characteristic configuration of the present invention, the microorganism is selected from a group consisting of yeast, lactic acid bacteria, fungus, and deuteromycetes.

(Configuration 5)

A fifth characteristic configuration of the present invention is green coffee beans obtained through the method as originally filed.

(Configuration 6)

A sixth characteristic configuration of the present invention is roasted coffee beans obtained by performing a roasting process on the green coffee beans as originally filed.

(Configuration 7)

A seventh characteristic configuration of the present invention is a coffee beverage obtained using the roasted coffee beans as originally filed as a raw material.

Effects of the Invention

The method for processing green coffee beans according to a first characteristic configuration of the present invention includes a fermentation step of bringing nutritive substances included in coffee cherries and microorganisms into contact with one another and causing fermentation, and a collection step of separating and collecting green coffee beans from the coffee cherries that have undergone fermentation. Accordingly, the present invention can be implemented during a refining step of separating and collecting the green coffee beans from the coffee cherries. For this reason, unlike the conventional art, a new step of extracting and adding coffee flavor and aroma components is not necessary, and the present invention can be implemented in a simple manner.

It should be noted that "coffee cherries" as referred to herein are, generally speaking, made up of a green coffee bean in the middle, coffee pulp surrounding the green coffee bean, and a husk surrounding the coffee pulp. Note that green coffee beans have the property of absorbing water in preparation for germination, whereas some microorganisms such as yeast are known for decomposing (fermenting) organic compounds (nutritive substances), thereby producing alcohols, organic acids, and esters (referred to hereinafter as "fermentation components").

Accordingly, when certain types of microorganisms accelerate fermentation in the presence of nutritive substances and green coffee beans, the fermentation components that are produced thereby can be absorbed by the green coffee beans along with water. As a result, by roasting the green coffee beans obtained in this manner, it is possible to obtain roasted coffee beans that include new flavor and aroma components (fermentation components) produced through the fermentation in addition to the conventional coffee flavor and aroma components produced through a roasting process; accordingly, new high-quality aromas (brewing aromas, estery aromas, and so on) can be added to a coffee beverage extracted from these roasted coffee beans.

Furthermore, in the present invention, the coffee pulp contained within the coffee cherries (the part containing sugars and other nutrients) is primarily used as the nutritive substances. Therefore, extraneous nutritive substances need not be prepared, and thus worries of expansive raw material costs are avoided.

As a further characteristic of the present invention, at least part of the pulp of the coffee cherries is exposed during the fermentation step, after which the microorganisms are allowed to accelerate fermentation. This makes it easier for the nutritive substances within the pulp to be released, and also makes it easier for the microorganisms to permeate the pulp. The speed of fermentation can therefore be significantly increased as compared to a case in which fermentation is commenced with microorganisms brought into contact with coffee cherries having unexposed pulp (the coffee cherries as harvested). As a result, the fermentation process can progress more rapidly, and thus the growth of other saprophytic bacteria (such as acetic acid bacteria present on the coffee cherries) has less influence (e.g. acetic acids being added to the green coffee beans), eliminating the chance of a drop in the quality of the green coffee beans.

It should be noted that two types of refining processes for obtaining green coffee beans from coffee cherries are known: "Natural" and "Washed". "Natural" is a method for obtaining green coffee beans that involves drying harvested green coffee cherries as they are, and after drying, the coffee cherries are husked to remove their pulp and skin, for example. In "Washed", harvested coffee beans are soaked in a vat to remove impurities and the coffee pulp is removed by a pulp removing machine, after which the beans are immersed in water in a fermentation vat to dissolve any remnants on the seed, and after washing, they are dried and husked to remove the skin and the like to yield green coffee beans.

According to the present invention as described thus far, it is easier for the nutritive substances within the pulp to be released and easier for the microorganisms to permeate the pulp because at least part of the pulp of the coffee cherries is exposed. Accordingly, the present invention can be applied in both "Washed" and "Natural" described above. For example, in a refining process according to "Natural", after harvesting the coffee cherries and partially exposing the pulp thereof, the cherries may be dried after undergoing a fermentation process in which microorganisms are sprayed directly thereon. Alternatively, in a refining process according to "Washed", after harvesting the coffee cherries and partially exposing the pulp thereof, the microorganisms may, for example, be added to the vat along with the cherries when the cherries are soaked in the vat to remove impurities. Because sugars and the like within the pulp can easily be released into the vat, the fermentation by the microorganisms is accelerated.

The method for processing green coffee beans according to a second characteristic configuration of the present invention partially exposes the pulp of the coffee cherries while leaving the husk. Therefore, the pulp can easily be partially exposed by, for example, cutting the surface of the harvested coffee cherries with a sharp blade (without inflicting cuts upon the green coffee beans within), and fermentation by the stated microorganisms can be accelerated thereafter.

The method for processing green coffee beans according to a third characteristic configuration of the present invention removes only the husk of the coffee cherries, leaving the pulp of stated coffee cherries at least partially exposed. Through this, it is even easier for the nutritive substances within the pulp to be released, and the microorganisms come into contact with an even larger surface area. When coffee cherries are fermented with the stated microorganisms in such a state, the speed of fermentation can be increased even further.

In the method for processing green coffee beans according to a fourth characteristic configuration of the present invention, the microorganism is selected from a group consisting of yeast, lactic acid bacteria, fungus, or deuteromycetes. These microorganisms are easy to obtain, and because they respond to general culturing and preservation methods, are easy to handle as well.

Green coffee beans according to a fifth characteristic configuration of the present invention include new flavor and aroma components (fermentation components) produced through fermentation.

Roasted coffee beans according to a sixth characteristic configuration of the present invention include new flavor and aroma components (fermentation components) produced through fermentation, in addition to conventional coffee flavor and aroma components produced in the roasting process.

A coffee beverage according to a seventh characteristic configuration of the present invention is imparted with a high-quality aroma derived from new flavor and aroma components (fermentation components) produced through fermentation, in addition to conventional coffee flavor and aroma components produced in the roasting process.

BEST MODE FOR CARRYING OUT THE INVENTION

An embodiment of the present invention shall be described hereinafter.

EMBODIMENT

Coffee Cherries

"Coffee cherries" in the present invention refers to the fruit of the *Coffea* plant, which is made up of green coffee beans (seeds), pulp (the part including sugars and other nutrients), and a husk. To be more specific, the green coffee beans are innermost, surrounded by, in order, silverskin, parchment, pulp, and the husk. Coffee types that can be used include *Coffea arahica*, *Coffea robusta*, and *Coffea liberica*, and these can have been grown in Brazil, Ethiopia, Vietnam, and Guatemala, for example, although there is no particular limitation to these. It should be noted that undried and dried coffee cherries are used in this embodiment, and taking the specific gravity of a green coffee bean as 1, these have specific gravities of "coffee cherry (undried):dried coffee cherry:green coffee bean=6:4:1."

(Nutritive Substances)

Fruit, fruit juice, sugars, culture media, and the like can be given as examples of nutritive substances used in the fermentation process of the present invention; however, coffee pulp is preferable for use as the metabolite. It should be noted, however, that "coffee pulp" as stated in the present invention shall, for the sake of simplicity, refer to all parts of the coffee cherry (regardless of whether undried or dried) aside from the green coffee bean and husk thereof.

As coffee pulp, coffee cherries that have not undergone a refining process may be used, or alternatively, the pulp obtained when the green coffee beans are removed from the coffee cherries during the refining process may be used. In addition, the coffee pulp may be undried or dried. Note that the fruit pulp used is not limited to coffee pulp; it is possible to use other fruit pulps such as grape pulp, cherry pulp, and peach pulp as necessary. In addition, these fruit pulps, including coffee pulp, may be used alone or in arbitrary combinations.

The following can be given as examples of nutritive substances aside from the stated fruit pulps: fruit juice (from, for example, grapes, peaches, apples, and so on); sugars (for example, monosaccharides, disaccharides, and polysaccharides obtained from plants such as sugar cane and sweet potatoes); grains (for example, wort obtained from glycated wheat germ); and culture media. However, no particular limitation is placed on the components as long as they can be metabolized by the microorganisms, and these nutritive substances, including the fruit pulps, may be used along or in arbitrary combinations.

(Coffee Pulp Exposure Method)

In the case where the coffee cherries are taken as-is and the coffee pulp therein is used as the metabolite, a method of exposing at least part of the coffee pulp to the surface of the coffee cherries is suitable in order to speed up fermentation.

As a method for exposing the coffee pulp, the harvested coffee cherries may be cut with a sharp blade (for example, scissors, a file, and so on), the coffee cherries may be pressurized using a threshing device or the like so that cuts appear in the husk, or the like; however, during such exposure, cuts are not inflicted on the green coffee beans within. Alternatively, a peeling machine may be used, removing only the husk of the coffee cherry and exposing the pulp thereby. Note that the abovementioned pulp exposure processing is not particularly necessary for coffee cherries in which at least part of the pulp has been exposed by cuts accidentally occurring during harvesting of the coffee cherries. Furthermore, the abovementioned pulp exposure processing is not particularly necessary in the case of using coffee pulp obtained when the green coffee beans are removed during the refining process; extra green coffee beans are added and fermentation is carried out.

(Microorganisms)

No particular limitation is placed on the microorganism used in the present invention as long as that microorganism is capable of metabolizing (fermenting) nutritive substances as mentioned above.

Yeast, lactic acid bacteria, fungus, deuteromycetes, and so on can be given as specific examples of the microorganism. These types of microorganisms can be obtained and handled with ease, and thus can be used suitably.

Because of its safety as a food product, one example of yeast that can be used favorably is brewers yeast, such as wine fermentation yeast and beer fermentation yeast, which has a long history of use in food products. One example of yeast for wine fermentation is the commercially-available dry yeast Lalvin L2323 strain (abbreviated hereinafter as L2323; Sceti Co., Ltd.) or CK S102 strain (abbreviated hereinafter as S102; BioSpringer). Ordinarily, L2323 is used to brew red wine and S102 is used to brew rose wine. Using yeast in this way allows characteristic aromas, such as brewing aroma, to be added.

Any lactic acid bacteria that is known to the public and used to manufacture fermented milk, lactic acid bacteria beverages, or cheese fermented milk, for example, can be used. As one illustrative example, lactic acid bacteria of the *Lactobacillus* genus can be used.

*Neurospora crassa*, penicillium, mushrooms forming fruiting bodies, or the like can be utilized as the stated fungus.

*Geotrichum candidum*, *Geotrichum rectangulatum*, and *Geotrichum klebahnii*, which belong to the genus *Geotrichum*, are examples of deuteromycetes that can be utilized. Furthermore, *Aspergillus*, which is used to produce fermented food products such as sake, the distilled liquor known as shochu, miso bean curd, and soy sauce, can also be utilized.

According to the present invention, various flavors and aromas can be added by selecting different microorganism types and growth conditions. Thus, microorganisms that allow desired flavors and aromas to be added can be appropriately selected and used.

In the case where the microorganisms have been dried, they can be reconstituted by a method that is suitable for that microbe. For example, in the case of using dry yeast, the dry yeast can be used after being suspended for 20 to 30 minutes in water that has been heated to 37 to 41° C.

There are no particular limitations regarding the amount of microorganism used in the present invention as long as the effect of adding flavor and aroma can be obtained and the amount of organism can be suitably set in view of the culture time and the cost. For example, in terms of parts per amount of green coffee beans, between $1.0 \times 10^8$ cells/g and $1.0 \times 10^{10}$ cells/g is an appropriate amount of yeast and lactic acid bacteria, whereas from 0.01% to 0.1% of the weight of the green coffee beans is an appropriate amount of spores in the case of a fungus. 1.0 to 10 mg/g is an appropriate amount of deuteromycetes.

(Fermentation Process)

1. Method of Bringing Microorganisms and Nutritive Substances into Contact

The method described hereinafter can be given as an example of a method for bringing microorganisms and nutritive substances into contact with one another during the fermentation process of the present invention.

(a) Direct Contact Method

The "direct contact method" is a method that brings microorganisms and nutritive substances into direct contact in the presence of green coffee beans. For example, microorganisms are sprayed or scattered upon coffee cherries having at least part of the coffee pulp exposed (or upon a mixture of coffee pulp and green coffee beans obtained when the green coffee beans are removed during the refining process), bringing the microorganisms into direct contact, and fermentation is caused thereby. In particular, when causing fermentation using coffee cherries in which part of the pulp is exposed, fermentation progresses efficiently due to metabolized sugars and the like being localized at high concentrations; in addition, because the green coffee beans are present in the immediate vicinity, fermentation components such as alcohols and esters produced through fermentation can be quickly transferred to the green coffee beans. Note that in the case where dried coffee cherries (or coffee pulp) are used, fermentation may be carried out in a state in which a moderate amount of water has been added to the cherries/pulp.

(b) Indirect Contact Method

The "indirect contact method" is a method in which a fermentation vat containing a fermentation solution is prepared, green coffee beans, nutritive substances, and microorganisms are added to the fermentation solution, and the microorganisms are caused to come into contact with the nutritive substances released into the fermentation solution. For example, microorganisms and coffee cherries having at least part of the coffee pulp exposed (or upon a mixture of coffee pulp and green coffee beans obtained when the green coffee beans are removed during the refining process) are added to the fermentation solution, and fermentation is caused thereby.

2. Fermentation Conditions

There are no particular limitations regarding the fermentation conditions of the microorganisms, as long as fermentation is carried out. Conditions suitable for fermentation (for example, the type and amount (initial number) of microorganisms used, type and amount (concentration) of metabolite, temperature, moisture content, pH, oxygen or carbon dioxide concentration, fermentation time, and so on) can be set as seen fit, as necessary. Additionally, for example, additives such as pH adjustors, commercially-available nutrient cultures for correcting nitrogen and carbon sources, and the like may be accessorily added, aside from the stated nutritive substances.

To prevent growth of other microorganisms (saprophytic bacteria) particularly in the fermentation process of the present invention, fermentation may be carried out while controlling conditions such as the temperature, pH, carbon concentration, and so on. For example, fermentation may be carried out in a low-temperature environment, the temperature being from 15 to 30° C., in which the growth of other saprophytic bacteria can be suppressed. Fermentation may also be carried out under pH conditions in which pH adjustors or the like (citric acid, malic acid, lactic acid, and so on) are added, thereby making it possible to suppress the growth of other saprophytic bacteria. Alternatively, fermentation may be carried out under more anaerobic (or aerobic) conditions in which the carbon dioxide concentration (or the oxygen concentration) is raised and the growth of saprophytic bacteria is suppressed thereby.

In addition, the fermentation process of the present invention can be carried out in a thermostatic chamber, tank, or storage chamber in which the stated fermentation conditions (for example, the type and amount (initial number) of microorganisms used, type and amount (concentration) of nutritive substances, temperature, moisture content, pH, oxygen or carbon dioxide concentration, fermentation time, and so on) can be automatically and/or manually controlled.

Note that there are no limitations regarding the time required for the fermentation process, and this can be suitably chosen based on the quality and strength of the flavor and aroma to be added or based on the microorganism or metabolite. It is also possible to end the fermentation process once the nutritive substances have been consumed.

The fermentation process can be ended through a combination of such methods as heat sterilization, water rinsing, sun-drying, separating the nutritive substances and green coffee beans, or roasting. For example, fermentation can be ended by using a drying machine to dry the product at 50 to 60° C. for about one day.

3. Fermentation Process Example

An example of fermentation using coffee cherries shall be described here.

In the present invention, the fermentation step can be carried out within the refining step of the green coffee beans.

Two types of refining processes for obtaining green coffee beans from coffee cherries are known: "Natural" and "Washed".

"Natural" is a method for obtaining green coffee beans that involves drying harvested green coffee cherries as they are, and after drying, the coffee cherries are husked to remove their pulp and skin, for example.

On the other hand, in "Washed", harvested coffee beans are soaked in a vat to remove impurities and the coffee pulp is removed by a pulp removing machine, after which the beans are immersed in water in a fermentation vat to dissolve any remnants on the seed, and after washing, they are dried and husked to remove the skin and the like to yield green coffee beans.

"Natural" process is easy to conduct, but it is mainly suited for areas with dry climates. On the other hand, "Washed" process is primarily suited for areas that are characterized by abundant rainfall.

For example, in "Natural" process, coffee cherries are harvested; their surfaces are cut with a knife or the like, thus partially exposing the coffee pulp; the microorganisms are brought into direct contact with the cherries through the abovementioned direct contact method and allowed to ferment; and after the fermentation, the cherries are dried.

For example, in "Washed" process, coffee cherries are harvested; their surfaces are cut with a knife or the like, thus partially exposing the coffee pulp; and when the cherries are immersed in a water-filled vat and impurities are removed therefrom, the microorganisms are added to the water-filled vat (fermentation vat) along with the cherries, and allowed to ferment. Because the cherries are cut and the pulp is exposed, sugars (nutritive substances) within the pulp can easily be released into the vat, facilitating fermentation through the microorganisms. Alternatively, fermentation through the stated direct contact method or indirect contact method can be performed before submerging the harvested coffee cherries in the vat, or before the coffee pulp has been removed from the coffee cherries that have been immersed in the vat and had impurities removed.

Note that the pulp of coffee cherries still on the plant may be exposed prior to the coffee cherries being harvested, and fermentation instigated through the stated direct contact method.

Coffee cherries for which the fermentation process has ended have the pulp removed through a normal refining process after having the microorganisms rinsed off and removed with water or with the microorganisms still attached. The cherries are then threshed and the green coffee beans removed (one or two green coffee beans can be obtained from a single coffee cherry).

The green coffee beans removed in this manner can be roasted through a normal method, and various types of coffee beans that have been roasted to differing degrees (from light roasts to Italian roasts) can be obtained.

The roasted coffee beans that are obtained can be ground and soaked with water, which is then extracted through filtration by a filter; this can be taken as a regular coffee beverage, or it can be used as an industrial ingredient for instant coffee, coffee extract, canned coffee, or the like.

Other Embodiments

1. In the present invention, when the microorganisms and nutritive substances are brought into contact with one another using the stated indirect contact method, fermentation may be carried out in a state in which the microorganisms appear to be separated from the nutritive substances and green coffee beans. For example, the green coffee beans and nutritive substances may be placed in a bag and the bag immersed in the fermentation solution, after which the microorganisms are added to the fermentation vat and fermentation carried out thereby. The bag used in such a case is constructed from a filter material or the like in which a plurality of very small holes is provided, through which it is not possible for the microorganisms to pass into the bag (or it is difficult for the microorganisms to pass into the bag) but it is possible for the nutritive substances and fermentation components to pass out of the bag (or it is easy for the nutritive substances and fermentation components to pass out of the bag).

To be more specific, when, for example, coffee cherries with the pulp partially exposed are placed in the aforementioned bag and immersed in the fermentation solution, nutritive substances released by the coffee cherries pass through the holes of the bag. These nutritive substances are metabolized by the microorganisms (fermented) and the fermentation components produced thereby pass through the aforementioned holes and are absorbed into the green coffee beans.

In this case, the microorganisms are not brought into direct contact with the coffee cherries; therefore, it is possible to easily separate the coffee cherries and the microorganisms after the fermentation process has ended, and the refining process that follows can be performed more quickly. Note that conversely, the configuration may be such that the microorganisms are placed in the bag, or alternatively, the fermentation vat may be configured so as to be partitioned by the filter material into a portion for the microorganisms and a portion for the green coffee beans and nutritive substances (in other words, a portion for the coffee cherries).

The present invention shall be described in specific detail in the following working examples; however, the invention is not limited to these working examples.

Working Example 1

The three methods listed below were used as methods for exposing the pulp of the coffee cherries. In all the following methods, it was possible to expose the pulp without damaging the green coffee beans within the coffee cherries.
1. The coffee cherries are scratched with scissors so that the pulp is exposed through the husk.
2. The coffee cherries are scratched with a file so that the pulp is exposed through the husk.
3. The coffee cherries are struck with a mallet (to a degree that does not split the green beans inside) thereby making cuts in the cherries.
4. The coffee cherries are passed through a pulping machine.

Working Example 2

Coffee cherries in which the pulp has been partially exposed using a mallet ("pulp partially exposed") and coffee cherries in which the pulp has not been exposed ("no exposure") were each immersed in water, and the nutritive substances (monosaccharides and free amino nitrogen) present in this liquid prior to fermentation were evaluated. 100 g each of the exposed/non-exposed coffee cherries were immersed in 100 ml of water respectively, agitated, and the liquid was then evaluated.

Monosaccharides were analyzed through liquid chromatography. The apparatus used was an HPLC-type manufactured by the Shimadzu Corporation. The column used was a Showdex KS-802, and detection was carried out with the sensitivity of the differential refractometer being $8 \times 10^{-5}$ UFS. The mobile phase was 0.8 ml/min water, and the column temperature was 80° C. Quantitative determination was based on an absolute calibration curve. Free amino nitrogen was measured using a ninhydrin colorimetric method.

TABLE 1

|  | No exposure | Pulp Partially Exposed |
|---|---|---|
| Monosaccharides (wt %) | 0.06 | 1.15 |
| Free Amino Nitrogen (mg/100 ml) | 0.99 | 6.90 |

As is apparent from the analysis values, cutting the coffee cherries allows more sugars and nitrogen sources, which are the nutritive substances of the microorganisms, to be extracted in the fermentation solution immediately after the coffee cherries are immersed.

Working Example 3

The immersion solution as described in the stated working example 2 was inoculated with a microorganism used in fermentation (*Geotrichum* sp., SAM 2421 strain; International Deposit Number FERM BP-10300), and fermentation carried out at room temperature with the solution allowed to stand. Liquid chromatography was used to analyze the organic acids in the liquid after two days of fermentation. The apparatus used was a Shimadzu Corporation HPLC-type. The column used was a Shim-pack SCR-102H, and detection was carried out with an electric conductivity detector CDD-6A. The column oven temperature was 40° C.; reaction and elution was performed with a Tris buffer containing p-toluenesulfonic acid. Quantitative determination was based on an absolute calibration curve. The results are shown in Table 2.

TABLE 2

| Component Name | No Exposure | Pulp Partially Exposed |
|---|---|---|
| Lactic Acid | 2159 | 4498 |
| Acetic Acid | 331 | 773 |

(Unit: ppm)

As is apparent from the analysis values, more organic acids (lactic acid and acetic acid) can be produced through fermentation when using coffee cherries in which the pulp is partially exposed.

Working Example 4

After being fermented as described in the stated working example 3, the coffee cherries were removed from the fermentation solution, discarded, and then dried for 48 hours in a drier at 55° C.; after this, the pulp and husk was removed, and green coffee beans were obtained thereby. 100 g of the green coffee beans obtained were roasted using a "deep roast" button of a fully-automatic household coffee bean roasting machine (CRPA-100, Tortoise Co. Ltd.). The roast time was approximately 25 minutes.

Sensory evaluation was performed by a panel of five coffee sensory evaluators. 30 g of each green coffee bean was placed in a dedicated sensory flask as is without being ground, and this was capped. The cap was removed at the time of evaluation, which was based on three criteria: brewing aroma, estery aroma, and roast aroma. A normal Brazilian Santos bean (roasted bean) was used as a control, with larger numbers thereof indicating "strong" and smaller numbers indicating "weak"; the evaluation was performed on a point scale of 1 to 5 in increments of 0.1. Table 3 shows the results of the average values of the five assessors.

Compared to the control sample and the sample with no pulp exposure, the sample in which the pulp was exposed had advanced production of brewing aroma and estery aroma, which are components of a fruity aroma, despite the roast aroma being the same.

TABLE 3

Sensory Evaluation of Roasted Beans

| Evaluated Item | Control | No Exposure | Pulp Partially Exposed |
|---|---|---|---|
| Brewing Aroma | 1.0 | 2.0 | 2.0 |
| Estery Aroma | 3.0 | 4.0 | 4.8 |
| Roast Aroma | 3.0 | 3.0 | 3.0 |

Working Example 5

Gas chromatography (GC) was used to analyze the aroma components of each type of roasted bean described in the state working example 4.5 g of each unground green coffee bean was placed in GC sample tubes, and the headspace gas was analyzed. The devices used were an Agilent 7694 Headspace Sampler and an Agilent 6890 GC system. A sample was introduced at 60° C. over 15 minutes at a 10:1 split; the column used was a CP 7673wax (25 mm long×0.25 mm in internal diameter, and a thickness of 1.2 μm). The temperature was held at 40° C. for five minutes and then increased 10° C./min up to 220° C., then held at 220° C. for 20 minutes. MSD and FID were used as detectors. The results are shown in Table 4.

TABLE 4

GC Results for Roasted Beans

| Component Name | No Exposure | Pulp Partially Exposed |
|---|---|---|
| Methyl Acetate | 476 | 1062 |
| Ethyl Acetate | 237 | 462 |
| Ethanol | 535 | 352 |

(Unit: picoampere/sec)

Compared to the sample in which the pulp is not exposed, the sample in which the pulp is exposed had an increased production of low-boiling components, such as methyl acetate and ethyl acetate, which make up part of the fruity aroma. However, the production of ethanol, which is a cause of an alcohol odor, was suppressed. It is thought that these effects were due to the positive growth of the microorganisms (*Geotrichum*).

Working Example 6

Sensory Evaluation of Coffee Extract

A coffee extract was produced using the respective roasted coffee beans as described in the stated working example 4. The roasted coffee beans were finely ground; 100 g of hot water was added to 12 g of ground beans, and the mixture was agitated. Coffee that floated to the surface was removed and sensory evaluation was performed on the supernatant fluid, in accordance with the cup test standard method. This was performed by a panel of five coffee sensory evaluators. Four items were evaluated: aroma (brewing aroma, estery aroma) and taste (bitterness, body). A coffee extract of Brazilian Santos beans was used as a control. Larger numbers indicated "strong" and smaller numbers indicated "weak", the evaluation being performed on a point scale of 1 to 5 in increments of 0.1. Average values of evaluation points are shown. The results are shown in Table 5. Compared to the control sample and the sample with no pulp exposure, the sample in which the pulp was exposed was favorable both in terms of aroma and taste.

TABLE 5

Sensory Evaluation of Coffee Extract

| | Evaluated Item | Control | No Exposure | Pulp Partially Exposed |
|---|---|---|---|---|
| Aroma | Brewing Aroma | 1.0 | 2.0 | 2.0 |
| | Estery Aroma | 3.0 | 4.2 | 4.8 |
| Taste | Bitterness | 3.0 | 3.0 | 3.0 |
| | Body | 3.0 | 4.0 | 4.5 |

Working Example 7

Results of GC Analysis of Components of Coffee Extract 10 ml of each coffee extract as described in the state working example 6 was placed in a GC sample tube and GC analysis was performed thereon. Other analysis conditions were based on the aforementioned method. The results are shown in Table 6.

In the coffee extract as well, compared to the sample in which the pulp is not exposed, the sample in which the pulp is exposed had an increased production of low-boiling components, such as methyl acetate and ethyl acetate, which make up part of the fruity aroma.

TABLE 6

GC Results for Extract

| Component Name | No Exposure | Pulp Partially Exposed |
|---|---|---|
| Methyl Acetate | 51 | 242 |
| Ethyl Acetate | 36 | 115 |

(Unit: picoampere/sec)

Working Example 8

Using wine yeast (Lalvin EC 1118), coffee cherries in which the pulp has been partially exposed ("pulp partially exposed") and coffee cherries in which the pulp has not been exposed ("no exposure") were fermented using the direct contact method. Cuts were inflicted on the surface of Okinawan-grown coffee cherries using scissors or a file, partially exposing the pulp thereof. 0.1 g of dried yeast was reconstituted with 20 ml of warm water, and this was directly scattered upon 1 kg of each type of coffee cherry. This was fermented in a 3 L Erlenmeyer flask for 2 to 5 days at room temperature (20-30° C.). After fermentation, the cherries were dried at 45° C. in a drying machine for 72 hours. The pulp and husk were then removed, and green coffee beans were obtained thereby. The same processing was performed on the cherries with no surface treatment and no pulp exposure.

100 g of the green coffee beans obtained were roasted using a "deep roast" button of a fully-automatic household coffee bean roasting machine (CRPA-100, Tortoise Co. Ltd.). The roast time was approximately 25 minutes. Then, sensory evaluation was performed using the same method as described in working example 4. The results are shown in Table 7.

Regardless of the method for inflicting cuts on the cherries, the sample in which the pulp is exposed had advanced production of brewing aroma and estery aroma, which are components of a fruity aroma, as compared to the control (Brazilian Santos beans) and the sample with no exposure, despite having the same roast aroma. In other words, it was deemed that the present processing method is effective even when using wine yeast.

TABLE 7

| Evaluated Item | Control | No Exposure | Pulp Partially Exposed (Scissors) | Pulp Partially Exposed (File) |
| --- | --- | --- | --- | --- |
| Brewing Aroma | 1.0 | 3.0 | 3.6 | 4.0 |
| Estery Aroma | 3.0 | 4.0 | 4.2 | 4.8 |
| Roast Aroma | 3.0 | 3.0 | 3.0 | 3.0 |

Working Example 9

Sensory evaluation was performed on coffee extracts of the respective roasted coffee beans obtained as described in the state working example 8. Coffee extract was produced using roasted beans of each of the stated types of roasted beans. The roasted coffee beans were finely ground; 100 g of hot water was added to 12 g of ground beans, and the mixture was agitated. Sensory evaluation was performed on the obtained coffee extract based on the same method as described in working example 6. The results are shown in Table 8.

Compared to the control (coffee extract of Brazilian Santos beans) and the sample with no pulp exposure, the sample in which the pulp was exposed was favorable both in terms of aroma and taste. In other words, it was deemed that the present processing method is effective even when using wine yeast. Furthermore, inflicting cuts using a file was more effective as a method for exposing the pulp than was inflicting cuts using scissors.

TABLE 8

| Evaluated Item | Control | No Exposure | Pulp Partially Exposed (Scissors) | Pulp Partially Exposed (File) |
| --- | --- | --- | --- | --- |
| Brewing Aroma | 1.0 | 3.0 | 3.6 | 4.0 |
| Estery Aroma | 3.0 | 4.2 | 4.4 | 4.8 |
| Bitterness | 3.0 | 3.0 | 3.0 | 3.0 |
| Body | 3.0 | 4.0 | 4.2 | 4.2 |

INDUSTRIAL APPLICABILITY

The present invention has exceptional utility in not only processing tasks such as refining and roasting coffee cherries, but also in the task of manufacturing coffee beverages by manufacturing various types of products (regular coffee, instant coffee, canned coffee, coffee aroma, etc.) from roasted coffee beans produced from green coffee beans that have been processed according to the invention, and can contribute to the further development of those industries.

The invention claimed is:

1. A method for processing green coffee beans comprising:
    a) treating coffee cherries to at least partially expose pulp of the coffee cherries, so that the pulp is exposed through husks;
    b) fermenting the treated coffee cherries by bringing the treated coffee cherries into contact with a microorganism;
    c) separating and collecting green coffee beans from the coffee cherries that have undergone the fermentation step; and
    d) producing coffee beans containing aromas, wherein said aromas are products of fermenting with said microorganism,
wherein the microorganism is a *Deuteromycete*.

* * * * *

UNITED STATES PATENT AND TRADEMARK OFFICE
CERTIFICATE OF CORRECTION

PATENT NO.         : 8,545,910 B2                                                             Page 1 of 1
APPLICATION NO. : 11/886842
DATED              : October 1, 2013
INVENTOR(S)        : Yomo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1002 days.

Signed and Sealed this

Fifteenth Day of September, 2015

Michelle K. Lee
*Director of the United States Patent and Trademark Office*